United States Patent [19]

Primdahl et al.

[11] Patent Number: 5,211,880
[45] Date of Patent: May 18, 1993

[54] PROCESS FOR THE PREPARATION OF AMMONIA SYNTHESIS GAS

[75] Inventors: Ivar I. Primdahl, Copenhagen; Giorgio P. Serra, Gentofte, both of Denmark

[73] Assignee: Haldor Topsoe A/s, Denmark

[21] Appl. No.: 812,566

[22] Filed: Dec. 20, 1991

[30] Foreign Application Priority Data

Dec. 21, 1990 [DK] Denmark .............................. 3050/90

[51] Int. Cl.$^5$ ................................................ C10J 1/02
[52] U.S. Cl. ..................................... 252/376; 252/377
[58] Field of Search ............ 252/376, 377, 375, 393.1, 252/DIG. 1

[56] References Cited

U.S. PATENT DOCUMENTS 3,598,527  8/1971  Quartulli et al. ...................... 252/373
4,810,417  3/1989  Diemer et al. ....................... 252/377
5,011,625  4/1991  LeBlanc ............................... 252/376

Primary Examiner—Marianne M. Cintins
Assistant Examiner—John Peabody
Attorney, Agent, or Firm—Ostrolenk, Faber, Gerb & Soffen

[57] ABSTRACT

A process for the preparation of ammonia synthesis gas by steam reforming and/or partial oxidation of a hydrocarbon feedstock comprises the further steps of catalytically converting a part of the synthesis gas to methanol, liquifying and separating the prepared methanol from remaining nitrogen rich gas, then reconverting the nitrogen depleted methanol to hydrogen and carbon oxides gas and recombining the gas with the reminder of the nitrogen containing synthesis gas to obtain stoichiometric ammonia synthesis gas.

12 Claims, 1 Drawing Sheet

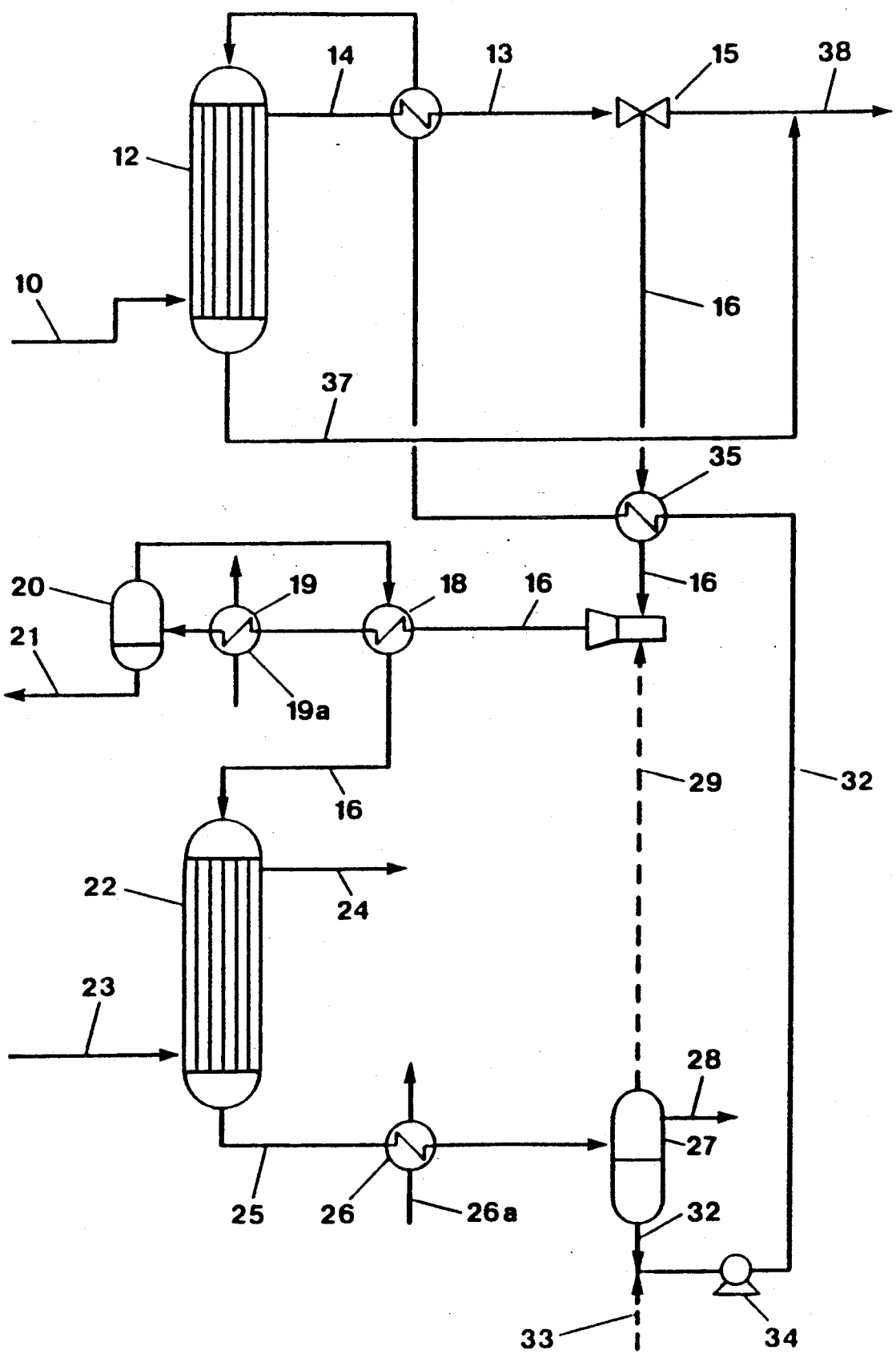

PROCESS FOR THE PREPARATION OF AMMONIA SYNTHESIS GAS

The present invention relates to the preparation of ammonia synthesis gas and, in particular, to the adjustment of the $H_2:N_2$ ratio in such a gas.

Ammonia synthesis gas is conventionally prepared by subjecting hydrocarbon feed of natural gas or higher hydrocarbons to primary steam reforming and subsequently secondary reforming.

During primary steam reforming the feed is reacted with steam in the presence of a reforming catalyst arranged in externally heated reformer tubes. The primary reformed gas is then fed into a secondary reformer, wherein hydrogen and residual hydrocarbons in the gas are partial oxidized with air or oxygen enriched air in the presence of a secondary reforming catalyst The amount of air introduced into the secondary reformer is, thereby, limited by the stoichiometry of the ammonia synthesis.

Alternatively or in addition to the above reforming sequence ammonia synthesis gas may be prepared by total adiabatic reforming in an autothermic reformer. Autothermic reforming is, preferably, used when supplemental oxygen is available. During adiabatic reforming the hydrocarbon feed is catalytically reacted with oxygen in a fixed bed of nickel containing reforming catalyst.

Depending on process conditions and feed composition it is often necessary during secondary or adiabatic reforming to supply air in excess of what is required to obtain a stoichiometric $H_2:N_2$ molar ratio of about 3 as required in ammonia synthesis. This is, in particular, necessary when no supplemental oxygen is available.

In order to obtain stoichiometric ammonia synthesis gas excessive nitrogen amounts, introduced into the synthesis gas during the partial oxidation step by addition of non-stoichiometric amounts of air, has to be removed before the synthesis gas enters the ammonia synthesis loop.

At present the most commonly used methods to remove nitrogen from ammonia synthesis gas on industrial scale are pressure swing adsorption and cryogenic separation.

At pressure swing adsorption nitrogen molecules are removed from synthesis gas by adsorption on synthetic molecular sieves. The sieves are arranged in a number of adsorption beds, wherein the molecules are removed at high pressure followed by depressurization and purging at low pressure or under vacuum. Cryogenic separation of nitrogen is usually accomplished by washing with liquid nitrogen The nitrogen is liquefied in a refrigeration cycle through compression, cooling and expansion. The process is carried out in a cold box, wherein excess of nitrogen is removed from synthesis gas by liquefaction and gas liquid separation.

The major drawback of pressure swing adsorption and cryogenic separation is an expensive energy demand of these processes caused by refrigeration or expansion and recompression of the synthetic gas.

The process of this invention provides an economical method for the adjustment of the $H_2:N_2$ ratio in ammonia synthesis gas.

Contrary to the above separation processes, excess of nitrogen in ammonia synthesis gas initially prepared by steam reforming and partial oxidation of hydrocarbon feed is by the inventive process removed through catalytic conversion of a part of the gas to a high temperature boiling product, which subsequently is liquefied in economic manner and from which excess of nitrogen is removed by gas-liquid separation. It is thus possible to adjust the nitrogen content in the synthesis gas without expensive refrigeration and gas expansion, and, thereby, to improve the overall efficiency of the ammonia synthesis process.

In accordance with the present invention ammonia synthesis gas initially prepared by steam reforming and/or partial oxidation of hydrocarbon feed is adjusted to stoichiometric requirements in the synthesis of ammonia by a sequence of process steps. In a first process step synthesis gas leaving the partial oxidation process is divided into two portions, where in one portion nitrogen is removed by catalytic reacting hydrogen and carbon oxides contained in the initially prepared synthesis gas to a gas mainly consisting of methanol, unreacted hydrogen, carbon oxides and nitrogen; cooling the reacted gas to a liquid methanol phase and a nitrogen rich gas phase; and separating the nitrogen rich gas phase from the liquid methanol phase by gas-liquid phase separation. The thus obtained nitrogen depleted liquid methanol phase is in a further process step evaporated and catalytically cracked to hydrogen and carbon oxide rich gas, which gas is then recombined with the remaining portion of the synthesis gas from the first process step.

Thereby, raw ammonia synthesis gas is prepared, containing nitrogen in an amount, which complies with the stoichiometric requirements in a subsequent ammonia synthesis.

Depending on conditions during the steam reforming and partial oxidation process, the content of nitrogen in the initially prepared synthesis gas may vary within a certain range. Thus, the volume of the portion from which nitrogen is removed has to be adjusted with respect to the actual content of nitrogen in the gas leaving the partial oxidation process.

Typically the gas portion, which is looped to the methanol converter represents from about 5 to 30% of the total gas volume in the initially prepared synthesis gas, the residual volume of the nitrogen containing gas is bypassed the nitrogen removal process and finally recombined with the nitrogen depleted gas portion to obtain raw ammonia synthesis gas with a stoichiometric amount of nitrogen.

Conversion of hydrogen and carbon oxides in the looped portion is based on the exothermic methanol equilibrium reactions:

$$CO + 2H_2 \rightleftharpoons CH_3OH; \quad -\Delta H\ (298K) = 91\ kJ/mole$$

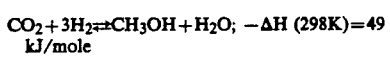
$$CO_2 + 3H_2 \rightleftharpoons CH_3OH + H_2O; \quad -\Delta H\ (298K) = 49\ kJ/mole$$

These reactions may conventionally be carried out in a fixed bed or boiling water methanol converter by contact with commercially available methanol catalysts.

Unconverted hydrogen and carbon oxides together with nitrogen and small amounts of methane further contained in the effluent from the methanol converter are pursuant to the basic concept of the invention separated from produced methanol by cooling with cooling water and subsequently phase separation of liquid methanol and nitrogen containing purge gas. As an advantageous feature of the inventive process gas-liquid separation is carried out at maximum overall process pressure, typically of between 20 and 100 bars, without intermediate and energy demanding expansion of the obtained methanol gas.

Pressure energy contained in the nitrogen rich purge gas may further be utilized in an expansion turbine before combustible gases in the purge gas are used as fuel in e.g. a burner.

The obtained nitrogen-free methanol is after separation pumped in the liquid phase to an evaporator and evaporated by indirect heat exchange with the initially prepared hot synthesis gas before being introduced into a methanol cracker.

In the cracker the evaporated methanol is decomposed by the endothermic methanol decomposing reaction:

Depending on process conditions in the cracker and on process steps in the further treatment of the synthesis gas it may be desirable to admix methanol with boiler feed water before methanol is passed to the methanol cracker, in order to obtain a gas with a low carbon monoxide content by the following reaction:

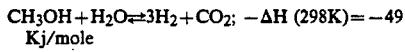

The above methanol decomposing reactions proceed rapidly to equilibrium in the presence of a conventionally copper containing methanol decomposing catalyst.

Necessary heat for the endothermic reactions is in a preferred embodiment of the invention supplied by the synthesis gas, which leaves the partial oxidation process at a high temperature. The synthesis gas is, thereby, introduced into the shell side of the cracker in indirect heat exchange with methanol passing through the cracker tubes.

Finally a synthesis gas with a nitrogen content meeting the stoichiometric requirement in a subsequent ammonia synthesis loop is obtained by combining the effluent from the methanol cracker with the by-passed portion of the initially prepared nitrogen containing synthesis gas.

As used hereinbefore and in the following term "initially prepared synthesis gas" covers raw ammonia synthesis gas containing nitrogen in excess of ammonia stoichiometry as prepared by primary steam reforming and/or partial oxidation of hydrocarbon feed. This gas is after nitrogen adjustment at the above described process conventionally treated by carbon monoxide shift conversion, carbon dioxide removal and methanation.

A particular embodiment of the present invention is more fully illustrated in the attached drawing, which represents a process diagram showing process steps for the adjustment of nitrogen content in initially prepared ammonia synthesis gas.

Initially prepared ammonia synthesis gas comprising hydrogen, carbon oxides, and stoichiometric excess of nitrogen as prepared by steam reforming and/or partial oxidation of a hydrocarbon feedstock is passed on supply line 10 to the shell side of tubular methanol cracker 12. Before being passed to the methanol cracker the synthesis gas has been cooled to about 300–400° C. by heat exchange for isolation of process waste heat or steam generation.

In the methanol cracker the synthesis gas supplies necessary heat to the endothermic methanol decomposition reactions proceeding in the cracker as further described hereinafter.

The heat exchanged synthesis gas leaves the methanol cracker through line 14 at a temperature of about 270–350° C. and is further cooled in heat exchanger 13.

The cooled synthesis gas is then divided in two portions by means of throttle valve 15 in line 14. One portion is looped through line 16 to methanol converter 22. The remaining volume of the synthesis gas is passed to line 38 for finally recombination with the looped and nitrogen depleted portion, as described in the following. The actual volume of the synthesis gas being looped to methanol converter 22 depends, as mentioned hereinbefore, on the amount of nitrogen in the initially prepared synthesis gas.

The gas portion, which is passed to the methanol converter is adjusted to a temperature of about 150–225° C. by passage through evaporator 35 in indirect heat exchange with methanol passing through the evaporator in line 32. Before being introduced into converter 22, the quantity of water further contained in the looped gas portion is removed by cooling the gas to 10–35° C. with cooling water 19a through cooler 19 and by separation of condensed water in separator 20. The separated water is discharged through line 21 for waste water treatment.

The remaining dried gas portion is passed from separator 20 to heat exchanger 18, where it is reheated to a temperature of 150–225° C. as required in the methanol converter by indirect heat exchange with the water containing synthesis gas passing in line 16 through the heat exchanger. The dried and reheated synthesis gas is then introduced into the tube side of methanol converter 22, where hydrogen and carbon oxides contained in the looped synthesis gas are reacted to methanol by the above mentioned exothermic methanol reactions.

For optimum conversion rates the methanol converter is cooled by boiler feed water 23, being passed to the shell side of the converter at a temperature of about 105–190° C. The boiler feed water is withdrawn from the shell side of the converter as medium pressure steam 24 at a pressure of 8–16 bars after having cooled the converter.

Methanol rich effluent leaving converter 22 in line 25 further contains unreacted hydrogen and carbon oxides together with the amount of nitrogen, which has been present in the synthesis gas being looped to the methanol converter. Methanol is separated from these gases by cooling the effluent in cooler 26 to a temperature of between 10–35° C. by cooling water 26a passing through the cooler in indirect heat exchange with the effluent.

Thereby, gaseous methanol in the effluent is liquefied to a liquid methanol phase, which is separated from the remaining nitrogen containing gas phase in separator 27. The gas-liquid phase separation is carried out without energy consuming gas expansion and recompression steps at a pressure of about 20–100 bars, which corresponds to the overall process pressure during the synthesis gas preparation and the previous methanol conversion step.

The separated nitrogen rich gas is purged at the same pressure from the separator through line 28. Pressure energy contained in the purge gas may advantageously be utilized in e.g. a gas turbine (not shown).

If desired, the separated gas may be recycled via lines 29 and 16 back to methanol converter 22 for further conversion of unreacted hydrogen and carbon oxides contained in the gas. The gas is, thereby, cycled by means of ejector pump 30, which is connected to lines 16 and 29 and driven by the pressure in the looped synthesis gas stream in line 16, which in that case is somewhat higher than the pressure in the separator.

Separated liquid methanol is withdrawn from separator 27 through line 32 and optionally mixed with boiler feed water supplied on line 33.

The methanol or the methanol-water mixture is then pumped in the liquid phase at a temperature of 10-35° C. through pump 34 in line 32 to evaporator 35, where it is evaporated by indirect heat exchange with the looped synthesis gas in line 16. The evaporated methanol or methanol-steam mixture is further preheated in preheater 13 to a temperature of about 220-270° C. by indirect heat exchange with the synthesis gas passing in line 14 through the preheater.

The preheated methanol gas is, subsequently, introduced into the tube side of methanol cracker 12, where it passes counter-currently and in indirect heat exchange with synthesis gas flowing at an inlet temperature of about 300-400° C. on the shell side of the cracker tubes.

In the methanol cracker the methanol or methanol-steam mixture is decomposed to hydrogen and carbon oxides by the previously described endothermic methanol decomposing reactions, which proceed in the presence of a methanol decomposing catalyst loaded in the methanol cracker tubes.

A hydrogen and carbon oxide rich effluent is withdrawn from the cracker through line 37 and looped back to the nitrogen containing synthesis gas in line 38.

The obtained nitrogen adjusted synthesis gas stream contains hydrogen, carbon monoxide and nitrogen in a molar ratio of $H_2+CO:N_2$, which after further treatment by the known carbon monoxide shift conversion results in the stoichiometric required $H_2:N_2$ ratio of about 3:1.

We claim:

1. A process for the preparation of raw ammonia synthesis gas, comprising the steps of:
    a) steam reforming and/or partially oxidizing a hydrocarbon feedstock containing carbon oxides together with hydrogen and nitrogen in excess of ammonia stoichiometry;
    b) dividing the steam reformed and/or partially oxidized hydrocarbon feedstock into a first portion and a second portion;
    c) subjecting the first portion to catalytic conversion of hydrogen and carbon oxides contained therein to methanol rich gas;
    d) cooling and separating the methanol rich gas from step c) into a liquid methanol phase essentially free of nitrogen and a nitrogen rich purge gas;
    e) evaporating and catalytically cracking the methanol phase separated in step (d) to hydrogen and carbon oxide rich gas by endothermic methanol cracking reactions; and
    f) recombining the hydrogen and carbon oxide rich gas from step (e) with the second portion of the steam reformed and/or partially oxidized hydrocarbon feedstock from step (b) to obtain raw ammonia synthesis gas containing carbon oxides together with hydrogen and nitrogen in an amount, corresponding to the ammonia stoichiometry.

2. The process of claim 1, wherein the necessary heat for the endothermic methanol cracking reactions in step (e) is supplied by indirect heat exchange with the steam reformed and/or partially oxidized hydrocarbon feedstock.

3. The process of claim 1, wherein the liquid methanol phase is separated from the nitrogen rich purge at a pressure of about 20-100 bars.

4. The process of claim 3, wherein pressure energy contained in the separated purge gas is utilized in a gas turbine.

5. The process of claim 1, wherein the nitrogen rich purge gas separated in step (d) and further containing unreacted hydrogen and carbon oxides is recycled to the catalytic methanol conversion in step (c).

6. The process of claim 5, wherein the purge gas is recycled by means of an ejector pump driven by the first portion of the steam reformed and/or partially oxidized hydrocarbon feedstock.

7. The process according to claim 1, wherein the first portion represents between about 5% to 30% by volume of the total volume of the steam reformed and/or partial oxidized hydrocarbon feedstock.

8. The process according to claim 2, wherein the first portion represents between about 5% to 30% by volume of the total volume of the steam reformed and/or partially oxidized hydrocarbon feedstock.

9. The process according to claim 3, wherein the first portion represents between about 5% to 30% by volume of the total volume of the steam reformed and/or partially oxidized hydrocarbon feedstock.

10. The process according to claim 4, wherein the first portion represents between about 5% to 30% by volume of the total volume of the steam reformed and/or partially oxidized hydrocarbon feedstock.

11. The process according to claim 5, wherein the first portion represents between about 5% to 30% by volume of the total volume of the steam reformed and/or partial oxidized hydrocarbon feedstock.

12. The process according to claim 6, wherein the first portion represents between about 5% to 30% by volume of the total volume of the steam reformed and/or partially oxidized hydrocarbon feedstock.

* * * * *